(12) United States Patent
Blease et al.

(10) Patent No.: US 8,051,915 B2
(45) Date of Patent: Nov. 8, 2011

(54) FIELD CONVERTIBLE VALVE AND SPRINKLER SYSTEM

(75) Inventors: Kevin J. Blease, Easton, PA (US);
Stephen R. Ide, Nazareth, PA (US);
William J. Reilly, Langhorne, PA (US)

(73) Assignee: Victaulic Company, Easton, PA (US)

( * ) Notice: Subject to any disclaimer, the term of this patent is extended or adjusted under 35 U.S.C. 154(b) by 276 days.

(21) Appl. No.: 12/359,617

(22) Filed: Jan. 26, 2009

(65) Prior Publication Data
US 2009/0139734 A1   Jun. 4, 2009

Related U.S. Application Data

(62) Division of application No. 11/565,764, filed on Dec. 1, 2006, now abandoned.

(51) Int. Cl.
*A62C 35/00* (2006.01)
(52) U.S. Cl. ............... 169/16; 169/17; 169/19; 169/20
(58) Field of Classification Search ............. 169/16–22; 239/556, 565; 137/601.13, 599.01
See application file for complete search history.

(56) References Cited

U.S. PATENT DOCUMENTS

| | | | |
|---|---|---|---|
| 1,689,980 A | 10/1928 | Tyden | |
| 1,759,158 A | 5/1930 | Hamilton | |
| 1,790,467 A | 1/1931 | Griffith | |
| 1,869,202 A | 7/1932 | Lowe et al. | |
| 1,942,822 A | 1/1934 | Lowe et al. | |
| 2,027,051 A | 1/1936 | Lowe et al. | |
| 2,047,719 A | 7/1936 | Wallace et al. | |
| 2,558,176 A | 6/1951 | Gieseler | |
| 2,713,916 A | 7/1955 | Muckenfuss | |
| 3,307,633 A | 3/1967 | Newall | |
| 3,589,445 A * | 6/1971 | Juliano | 169/17 |
| 3,595,318 A | 7/1971 | Merdinyan | |
| 3,759,331 A | 9/1973 | Livingston | |
| 5,295,503 A | 3/1994 | Meyer et al. | |
| 5,439,028 A | 8/1995 | Meyer et al. | |
| 6,000,473 A | 12/1999 | Reilly | |
| 6,029,749 A | 2/2000 | Reilly et al. | |
| 6,068,057 A | 5/2000 | Beukema | |
| 6,209,654 B1 * | 4/2001 | Curless | 169/17 |
| 6,293,348 B1 | 9/2001 | Reilly | |
| 6,536,533 B2 | 3/2003 | Reilly | |
| 6,666,277 B2 | 12/2003 | Reilly | |
| 6,675,110 B2 | 1/2004 | Engelmann | |
| 6,708,771 B2 | 3/2004 | Reilly | |
| 6,752,217 B2 | 6/2004 | Reilly | |
| 7,240,740 B2 | 7/2007 | Reilly et al. | |
| 2002/0121381 A1 * | 9/2002 | Reilly | 169/14 |
| 2007/0000671 A1 | 1/2007 | Reilly et al. | |

* cited by examiner

OTHER PUBLICATIONS

Victaulic, Series 751 FireLock Alarm Check Valve, IPS Carbon Steel Pipe Fire Protection Products 10.30, Jul. 2002. pp. 1-8.

*Primary Examiner* — Jason Boeckmann
(74) *Attorney, Agent, or Firm* — Ballard Spahr LLP (57) ABSTRACT

A fire suppression sprinkler system convertible between a wet and a dry mode of operation is disclosed. The system features a field convertible valve having a bypass loop with a bypass valve for selectively configuring the valve for wet or dry mode operation. For dry mode operation, the bypass valve is open. The field convertible valve also has a system actuator, a gas control valve and a water supply shut-off valve which are open in the dry mode. In the wet mode of operation, the bypass valve is open and the gas control and water supply shut-off valves are closed. The field convertible valve operates in a latch mode controlled by the system actuator in the dry mode, and as a flapper valve in the wet mode of operation. A method of converting the mode of operation of the sprinkler system is also disclosed.

8 Claims, 6 Drawing Sheets

FIELD CONVERTIBLE VALVE AND SPRINKLER SYSTEM

CROSS REFERENCE TO RELATED APPLICATIONS

This application is a divisional of and claims priority to pending U.S. application Ser. No. 11/565,764 filed Dec. 1, 2006.

FIELD OF THE INVENTION

This invention relates to valves used to control water flow to fire suppression sprinkler systems and especially to valves that are useable in both wet and dry systems.

BACKGROUND OF THE INVENTION

Fire suppression sprinkler systems comprise a piping network having branches extending throughout a building or other structure through which water or other fire suppressing fluid may be conveyed to be discharged on a fire within the structure. Sprinkler heads are mounted on the piping network and positioned throughout the structure, the sprinkler heads opening in response to a fire event to effect the water discharge. The piping network is connected to a source of pressurized water. Flow of water from the source to the network is controlled by a valve.

One characteristic which may be used to distinguish fire suppression sprinkler systems from one another is whether the system is a "wet" system or a "dry" system. In a wet system, pressurized water is present throughout the piping network when the system is in the ready state. The water is prevented from being discharged by the sprinkler heads themselves, which remain closed unless a fire event is detected. Once a fire occurs, the sprinkler heads in the vicinity of the fire open and immediately discharge water onto the fire. The valve which controls water flow from the source to the sprinkler heads opens in response to the demand for water flow.

In contrast, a compressed gas, typically compressed air, fills the piping network in a dry system when the system is in the ready state. The valve which controls the flow of water to the sprinkler heads is held closed and prevents water from entering the piping network until a fire event is detected. The valve is controlled by a system actuator which is capable of sensing a drop in the air pressure within the piping network occasioned, for example, when a sprinkler head opens in response to a fire event. When the sprinkler head opens, it discharges compressed air from the network, causing the air pressure to drop within the piping network. The system actuator senses the pressure drop and opens the valve, which allows water to flow into the piping network. The water displaces the air in the system and eventually reaches the open sprinkler head, which discharges the water onto the fire. Latched clapper valves are advantageous but high air pressure in conjunction with a low differential clapper design are also feasible.

Wet systems are preferred unless freezing environments are expected. Water is immediately available at the sprinkler heads for discharge as soon as one or more heads opens, thus providing rapid response to suppress a fast spreading fire. Dry systems are used when the piping network is subjected to temperatures that are below the freezing point of the water or other liquid used to suppress the fire. This may occur, for example, in an unheated structure, such as a warehouse located in a temperate zone where the ambient temperature varies seasonally below freezing for extended periods.

The valves used in the wet system to control the flow of water from the source to the network are different from those used in the dry system. Wet system valves act as check valves and open in response to a demand for water flow, but close automatically when demand for flow ceases. In contrast, dry system valves are held closed and are opened by a system actuator that responds to one or more indications of a fire event, for example, loss of air pressure in the piping network. The valve may also be actuated directly by a pressure differential.

It is often desirable to have the option to operate a sprinkler system in either the wet or the dry mode as a particular situation demands. This would be advantageous, for example, in unheated warehouses in cold climates to permit faster water delivery during warm periods. Furthermore, it may also be desired to readily convert a system from the wet to the dry mode or vice versa. This would be advantageous, for example, if the use to which the structure in which the sprinkler system is positioned changes. The prior art practice for effecting such multi-mode systems is to install both a wet system valve and a dry system valve, and all of their appurtenant auxiliary valves and components, in series with one another between the water source and the piping network. Then, depending upon which sprinkler system is desired, the appropriate valves and their associated components and auxiliary valves are used, and the valves associated with the other system are bypassed or otherwise opened or closed as required to isolate them. Using two valves and all of their associated components is complex and expensive however. There is clearly a need for an alternative which allows a sprinkler system to readily be converted from wet to dry mode and back again as required in response to a particular demand.

SUMMARY OF THE INVENTION

The invention concerns a valve for controlling fluid flow. The valve comprises a chamber having an inlet and an outlet. A seat is positioned within the chamber downstream of the inlet. A closing member is positioned within the chamber and is movable into and out of engagement with the seat to control fluid flow through the chamber. A latch is positioned within the chamber. The latch is movable between a first position engaging the closing member for maintaining the closing member in engagement with the seat, and a second position disengaged from the closing member and allowing the closing member to move out of engagement with the seat. A latch actuator is mounted on the valve and is engaged with the latch for moving the latch between the first and second positions. A bypass loop is connected to providing fluid communication between the inlet upstream of the seat and the chamber downstream of the seat. A bypass valve is positioned within the bypass loop. The valve is openable and closeable for controlling the flow of fluid through the bypass loop.

The valve according to the invention may also comprise a gas conduit in fluid communication with the chamber downstream of the seat, and a gas control valve positioned within the gas conduit for controlling flow of gas to the chamber.

The invention also includes a fire suppression sprinkler system convertible for use as a wet system or a dry system. The sprinkler system comprises a source of pressurized liquid and a piping network in fluid communication with the liquid source. A plurality of sprinkler heads are mounted on the piping network for discharging the liquid in the event of a fire. A first valve is positioned in the piping network between the liquid source and the sprinkler heads for controlling flow of the liquid thereto. A bypass loop is connected to provide fluid communication between a point upstream of the first valve and downstream thereof. A bypass valve is positioned in the bypass loop for controlling flow of the liquid therethrough. The system further includes a source of pressurized gas and a gas conduit providing fluid communication between the gas source and the piping network downstream of the first valve. A gas control valve is positioned within the gas conduit. A system actuator is in fluid communication with the gas source as well as the liquid source and the first valve. The system actuator opens the first valve in response to a drop in gas pressure within the piping network when the system is operated as a dry system. However, the first valve opens in response to flow from at least one of the sprinkler heads when the system is operated as a wet system.

The invention also encompasses a method of converting a fire suppression sprinkler system for use as a wet system or a dry system. The method comprises:

(a) providing a source of pressurized liquid;
(b) providing a piping network in fluid communication with the liquid source;
(c) providing a plurality of sprinkler heads mounted on the piping network for discharging the liquid in the event of a fire;
(d) providing a first valve positioned in the piping network between the liquid source and the sprinkler heads for controlling flow of the liquid thereto;
(e) providing a bypass loop for fluid communication between a point upstream of the first valve and downstream thereof, a bypass valve being positioned in the bypass loop for controlling flow of the liquid therethrough;
(f) opening the bypass valve to convert the system into a wet system;
(g) closing the bypass valve to convert the system into a dry system;
(h) providing a source of pressurized gas;
(i) providing a gas conduit for fluid communication between the gas source and the piping network downstream of the first valve, a gas control valve being positioned within the gas conduit;
(j) opening the gas control valve to convert the system into a dry system;
(k) closing the gas control valve to convert the system into a wet system;
(l) providing a system actuator in fluid communication with the gas source, the liquid source and the first valve;
(m) providing a shut-off valve between the liquid source and the system actuator;
(n) opening the shut-off valve to convert the system to a dry system; and
(o) closing the shut-off valve to convert the system to a wet system.

DETAILED DESCRIPTION OF THE EMBODIMENTS

Figure 1:
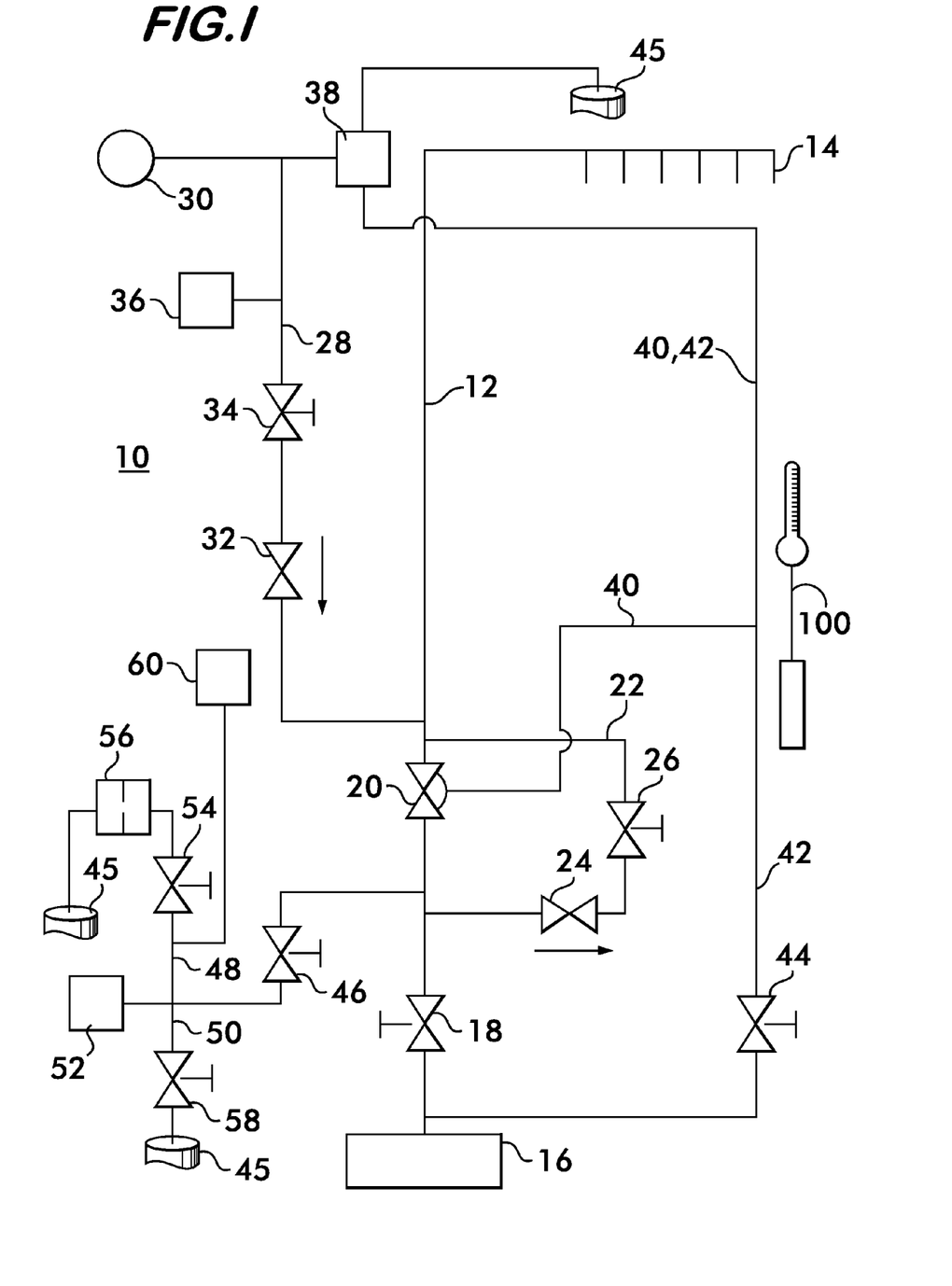
FIG. 1 is a schematic diagram of a field convertible sprinkler system according to the invention.

FIG. 1 shows, in schematic form, a convertible fire suppression sprinkler system 10 according to the invention. System 10 includes a piping network 12 having a plurality of sprinkler heads 14 mounted thereon. The network extends throughout a structure such as a building, warehouse, industrial complex or other facility needing fire protection. The sprinkler heads are not shown in detail, because virtually any type of sprinkler head is feasible with the system. The heads open in the event of a fire to discharge a fire suppressing fluid, typically water, to extinguish and prevent the spread of fire throughout the facility.

Piping network 12 is in fluid communication with a pressurized source of water 16 which supplies the fire suppressing fluid discharged from the sprinkler heads during a fire. Flow of water to the network is controlled by a valve 18, for example, a butterfly valve, which is positioned so that it may be used to isolate the entire system for repair or replacement of components. A field convertible valve 20 according to the invention is located downstream of and in series with the butterfly valve 18. The field convertible valve and its associated trim valves, described in detail below, allow the system 10 to be easily converted from a wet system to a dry system and vice versa.

A bypass loop 22 affords fluid communication around the convertible valve 10. Two valves are positioned in the bypass loop, a check valve 24 and a bypass valve 26 such as a ball valve which may be opened or closed as desired. Bypass valve 26 is one of the trim valves used to convert between a wet and dry system, explained in detail below.

A compressed gas conduit 28 is in fluid communication with the piping network 12 upstream of the convertible valve 20. The gas conduit is in fluid communication with a source of compressed gas 30, for example, a compressor or compressed gas tanks, which supply the compressed gas to the system when it is used in the dry mode of operation. Two valves are positioned within gas conduit 28, a check valve 32 and a gas control valve 34. Check valve 32 is designed to allow air to flow in both directions through the conduit but will prevent the flow of water toward the gas control valve 34. The check valve 32 is used to prevent water from contaminating components, such as the air compressor, associated with the dry mode operation of the system. Gas control valve 34 is another of the trim valves associated with convertible valve 20 used to convert between the wet and the dry modes of operation of the system 10. A pressure detecting device 36 may also be used on the gas conduit 28. Such devices are well known and include air pressure switches such as the EPS 40-2 marketed by System Sensor of St. Charles, Ill.

A system actuator 38 is also in fluid communication with the gas conduit 28. System actuator 38 controls the operation of convertible valve 20 when the system is operated in the dry mode. To effect this control, the system actuator is in communication with the convertible valve 20 through a water conduit 40. The system actuator is also in communication with the pressurized water supply 16 through another water conduit 42. A shut-off valve 44 is positioned in water conduit 42 and constitutes yet another trim valve used to convert the system between the different modes of operation.

When the system is operated in the dry mode, control of the convertible valve 20 is effected hydraulically by the system actuator 38 as described below. There are various system actuator designs, for example, those sold by Victaulic Company such as the model 776 or 753A. Operational and structural details of various system actuators may be found in U.S. Pat. Nos. 6,293,348, 6,536,533, 6,666,277 and 6,708,771, hereby incorporated by reference herein. The system actuator 38 may also be used in conjunction with an accelerator as described in U.S. Pat. No. 6,752,217, hereby incorporated by reference herein.

Sprinkler systems may have equipment to allow a test of the system functionality. The test equipment comprises a test valve 46 that is in fluid communication with the piping network 12 between the butterfly valve 18 and the convertible valve 20. The test valve 46 is in fluid communication with two conduit test branches, the wet mode branch 48 and the dry mode branch 50. Both branches may share a common flow sensor 52 which generates a signal when water is flowing through either of the branches. A wet mode test valve 54 is located in the wet mode branch 48. A flow restrictor device 56, such as an orifice plate is located downstream of the wet mode test valve. The wet mode branch vents into the drain piping 45 of the system. A dry mode test valve 58 is positioned in the dry mode branch 50. The dry mode test valve also vents to the system drain 45. Both the dry and wet modes are in fluid communication with an alarm 60, such as a water motor alarm, which is activated during system testing as described in detail below.

Sprinkler System Operation

With reference to FIG. 1, the sprinkler system 10 may be configured for dry mode operation by closing the bypass valve 26, opening the shut-off valve 44 to charge the actuator 38, opening the gas control valve 34, closing the wet mode test valve 54, opening the dry mode test valve 58, latching the field convertible valve 20 in the closed position, setting the system actuator 38 into its ready mode and charging the system actuator and the piping network 12 with compressed air from the source 30 through the compressed air conduit 28. The butterfly valve 18 is opened to provide water to the system from the source 16, the water charging the field convertible valve 20 and the system actuator 38 with hydraulic pressure through water conduits 40 and 42.

When a fire event is detected, one or more of the sprinkler heads 14 open, venting compressed air from the piping network 12. The resultant drop in air pressure within the system is detected by the system actuator 38 because it is in fluid communication with the network though compressed air conduit 28. (Compressed air from the source 30 cannot be supplied at a rate which will compensate for the drop in pressure due to opening of one or more sprinkler heads.) In response to the pressure drop in the piping network 12, the system actuator 38 vents the water conduit 40, 42 to the system drain 45. This reduces the hydraulic pressure within water conduit 40, which releases a latch mechanism (described below) within the field convertible valve 20. (Again, the system is designed so that water cannot be supplied from the source 16 through water conduit 42 at a rate sufficient to compensate for the reduction in hydraulic pressure within water conduits 40 and 42 occasioned by the action of system actuator 38.) Release of the latch mechanism allows the field convertible valve 20 to open in response to upstream pressure, thereby allowing water to flow from the pressurized source 16 through the piping network 12 to be discharged by the open sprinkler head or heads 14.

To test the system 11 when it is set to operate in the dry mode and in the ready condition (i.e., gas conduit 28, system actuator 38 and piping network 12 charged with compressed air, field convertible valve 20 latched and under hydraulic pressure by system actuator 38), the test valve 46 is opened allowing water to flow through the dry mode test branch 50 (the wet mode test valve 54 being closed) and to the water motor alarm 60. Water that flows through the dry mode test valve 58 is vented to the system drain 45.

To configure the system 10 for wet mode operation, the bypass valve 26 is opened, the shut-off valve 44 is closed, the gas control valve 34 is closed, the dry mode test valve 58 is closed and the wet mode test valve 54 is opened. The latching mechanism of the field convertible valve 20 is not engaged, allowing the valve to operate as a check valve and open in response to a demand for water when a sprinkler head opens. Closing the gas control valve isolates the piping network 12 from the compressed gas source 30, thereby allowing the piping network to be charged with water. Closing the shut-off valve 44 isolates the system actuator 38, rendering it ineffective as it does not control opening of the field convertible valve 20 during wet mode operation.

With the opening of the bypass valve 26 the bypass loop 22 is able to allow upstream pressure surges to go around the field convertible valve 20 without opening it. This is advantageous because the valve 20 is connected to an alarm, for example, water motor alarm 60, which is tripped when the valve opens to supply water to the piping network. Regulations require that false alarms caused by transient events such as pressure surges be avoided. To that end, the bypass loop is designed to allow flows less than about 4 gallons per minute, i.e., the valve will not open for flows under 4 gallons per minute, as such flows are not indicative of a fire event. However, the system must trigger an alarm anywhere within the range between about 4 gallons per minute and about 20 gallons per minute as such flows will be indicative of a fire event depending upon the water pressure at which the system is operated. The higher the system pressure the larger the flow required before sufficient pressure differential across the valve required to open the valve is reached.

In the wet ready mode, with the field convertible valve 20 closed, the butterfly valve 18 open and the piping network 12 charged with water, a fire event will cause one or more of the sprinkler heads to open, immediately discharging water onto the fire. This causes a drop in water pressure within the piping network. The flow rate demanded is greater than the bypass loop 22 can supply, and the resulting higher water pressure upstream causes the field convertible valve 20 to open, supplying water to the sprinkler heads and triggering water motor alarm 60.

For testing in the wet ready mode, the test valve 46 is opened. Water flows through the wet mode test branch 48 where it encounters a flow restrictor, such as orifice 56. The flow restrictor is designed to allow a build up of pressure within the wet mode test branch so that water will flow to the water motor alarm 60, which provides a signal indicative of the system status. Water from the wet mode test branch is discharged into the system drain 45.

Figure 2:
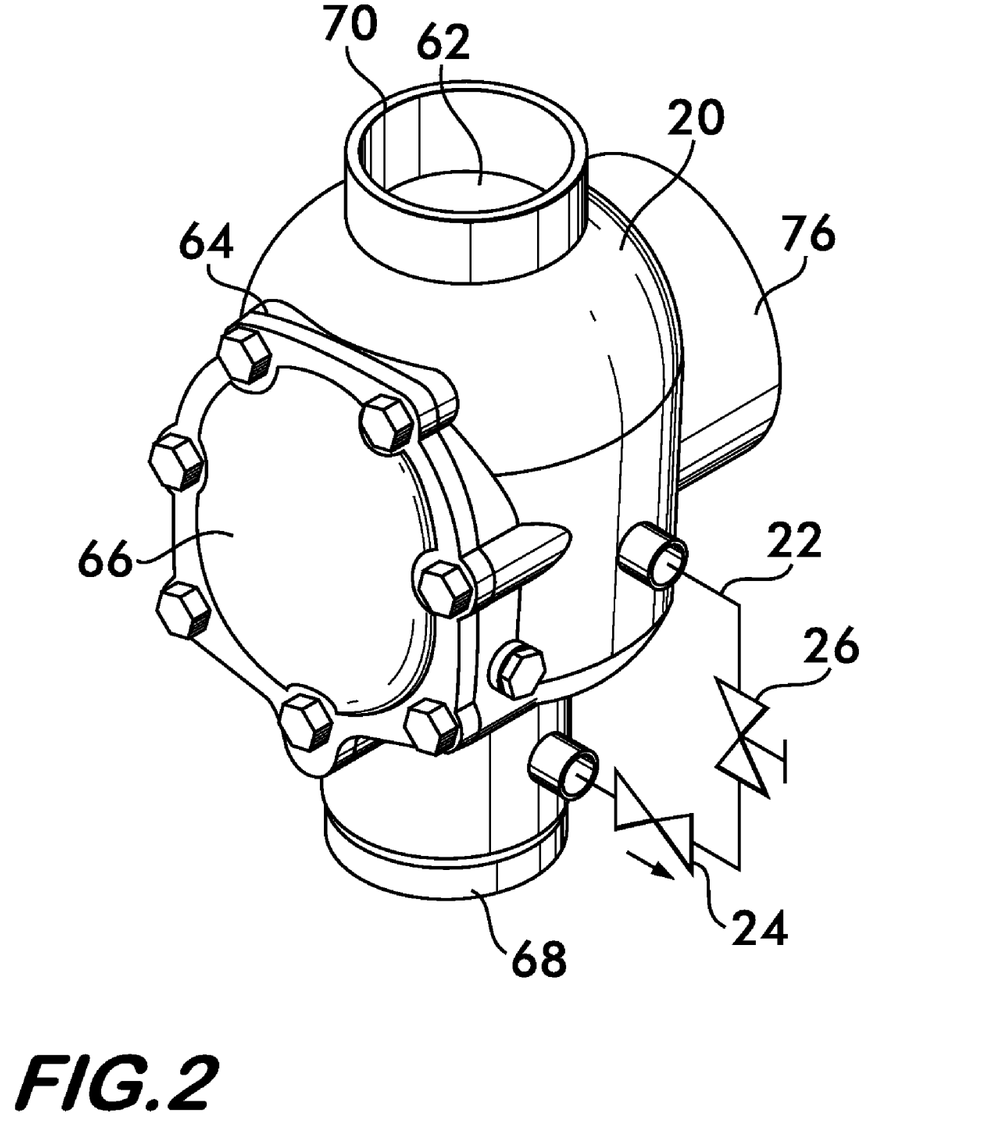
FIG. 2 is a right front side perspective view of a field convertible valve according to the invention.

FIG. 2 shows an example of a field convertible valve 20 according to the invention. Valve 20 comprises a chamber 62 which houses a closing member and latching mechanism described below. The chamber may have an access port 64 closed by a removable plate 66 to allow repairs to be effected. The chamber has in inlet 68 connectable to the pressurized water source 16 and an outlet 70 that is connectable to the piping network 12 as shown in FIG. 1.

With reference again to FIG. 2, the detailed configuration of the bypass loop 22 is illustrated. Bypass loop 22 provides fluid communication between the upstream and downstream sides of a seat 72 (see, for example, FIG. 4), allowing the valve seat and its closing member 74 (described below) to be circumvented in wet mode operation. As shown in FIG. 2, bypass loop 22 has two valves controlling flow through it, the bypass valve 26 and the check valve 24. As noted, the bypass valve 26 is opened when the field convertible valve 20 is operated in the wet mode, and closed to convert the valve 20 into the dry mode of operation. Check valve 24 prevents backflow of water from the piping network during wet mode operation of the system. This is advantageous because with variable water supplies the check valve allows transient water flux pressure to be trapped and contained in the system downstream of the valve.

Figure 3:
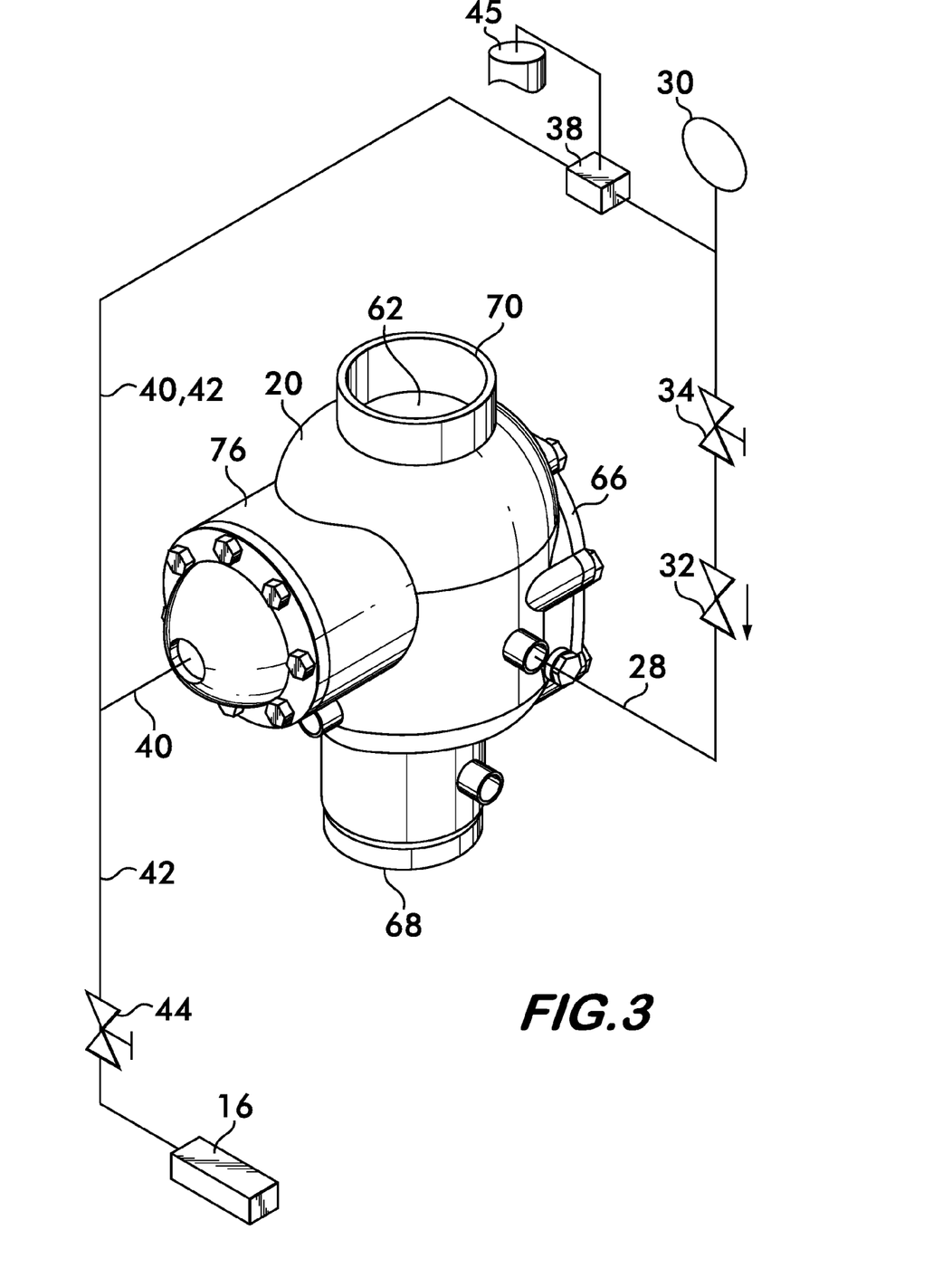
FIG. 3 is a left rear side perspective view of a field convertible valve according to the invention.

FIG. 3 shows details of the connection of the gas conduit 28 to the field convertible valve 20. Conduit 28 is in fluid communication with the chamber 62 downstream of the valve seat. The gas conduit also has two valves that control flow through it, the gas control valve 34 and the check valve 32. As noted above, the gas control valve 34 is open during dry mode operation and closed to convert the valve 20 and system 10 to wet mode operation. The check valve 32 is preferably a water only check valve in that it is configured to allow gas to pass freely in either direction but will prevent water from flowing from the valve 20 toward the pressurized gas source 30. Use of this check valve is advantageous to avoid water contamination of the system actuator 38 and the source of compressed gas 30, which could be a compressor for example. The gas conduit 28 is connected with the system actuator 38, and the system actuator is connected with the convertible valve 20 through the water conduit 40 as well as to the source of pressurized water 16 through the water conduit 42.

Figure 4:
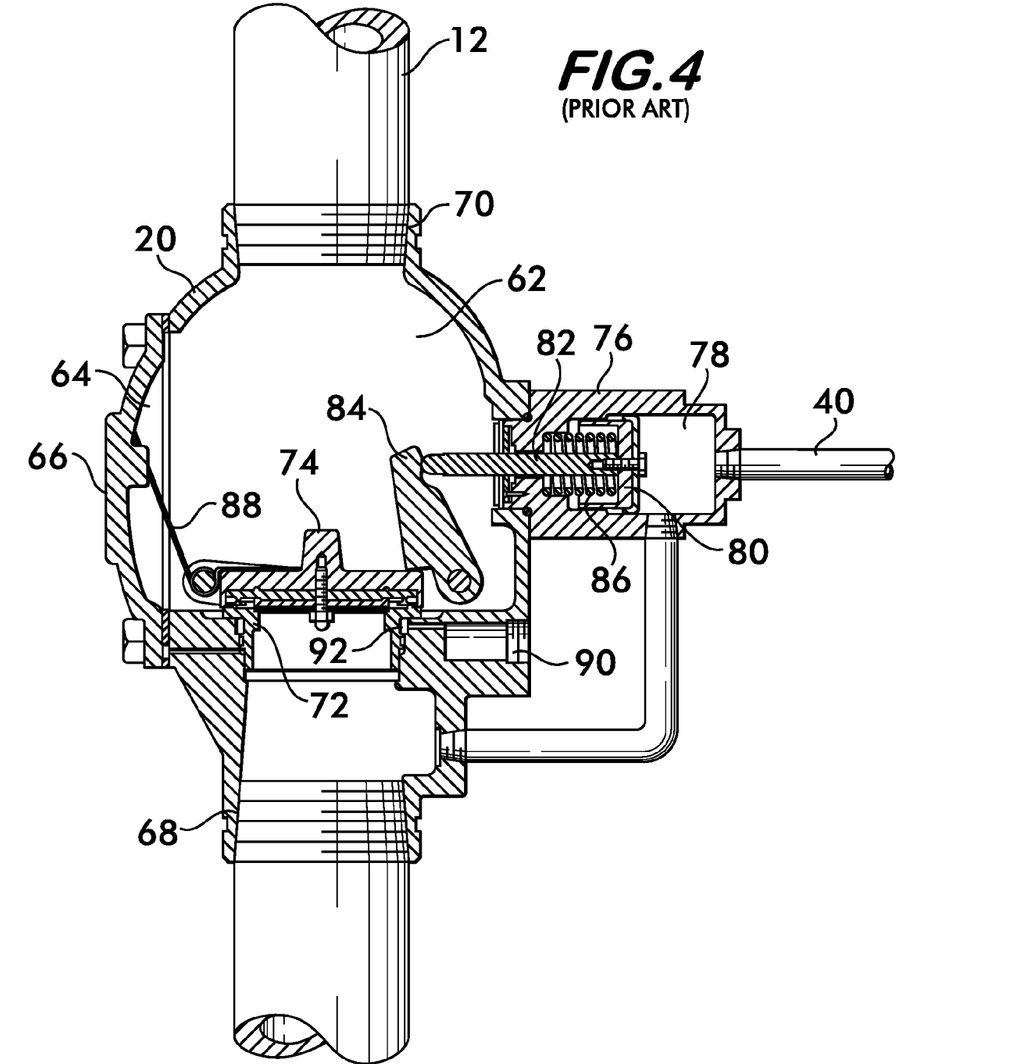
FIG. 4 is a longitudinal sectional view of one type of field convertible valve according to the invention.

FIG. 4 shows a sectional view of one example of a field convertible valve 20, illustrating the aforementioned valve seat 72 positioned within the chamber 62 downstream of the inlet 68. The valve closing member 74 associated with the seat is pivotally mounted within the chamber and is movable into and out of engagement with the seat to effect opening and closing of the valve.

The connection of the system actuator with the valve 20 affords fluid communication between the system actuator 38 and a latch actuator 76 best shown in FIG. 4. In this valve embodiment, the latch actuator 76 comprises a cylinder 78 that houses a piston 80 reciprocably movable within the cylinder in response to hydraulic pressure controlled by the system actuator 38 through water conduit 40. A piston rod 82 has a first end attached to the piston and an opposite end that extends into chamber 62 where it engages a latch 84 that is pivotably mounted within the chamber. When the field convertible valve 20 is used in the dry mode, latch 84 engages the valve closing member 74 to hold it in the closed position until the latch is released. The latch is released by a drop in hydraulic pressure within the cylinder 78. The hydraulic pressure drop is caused by the system actuator 38 reacting to a gas pressure drop within the piping network. The gas pressure drop is cause by a sprinkler head opening in response to a fire. A biasing spring 86 is positioned within the cylinder 78 to withdraw the piston rod 82 from engagement with the latch 84 when the hydraulic pressure drops in the cylinder. With the latch free to pivot, the upstream pressure acting on the valve closing member 74 can open the valve 20 by pivoting the valve closing member, permitting water flow to the piping network 12.

When the field convertible valve 20 is operated in the wet mode, the cylinder 78 is isolated from the hydraulic pressure of the source 16 by the closure of shut-off valve 44 (see FIG. 1) and the latch actuator is 76 is rendered non-functional. This allows the valve closing member to open in response to pressure changes within the chamber 62 as a result of a sprinkler head opening. When operated in the wet mode, the latch 84 may be biased away from the valve closing member by a biasing spring 88 so as not to interfere with the operation of the valve.

Note that there is a port 90 on the valve 20 which is in fluid communication with the chamber 62 through an opening 92 in the valve seat 72. When the valve closing member 74 pivots and disengages from the seat, the opening 92 is exposed. This allows water to flow out of the valve through the port, which is in fluid communication with the water motor alarm 60. In this manner, when used in the wet mode, an alarm is activated when the valve 20 opens.

Figure 5:
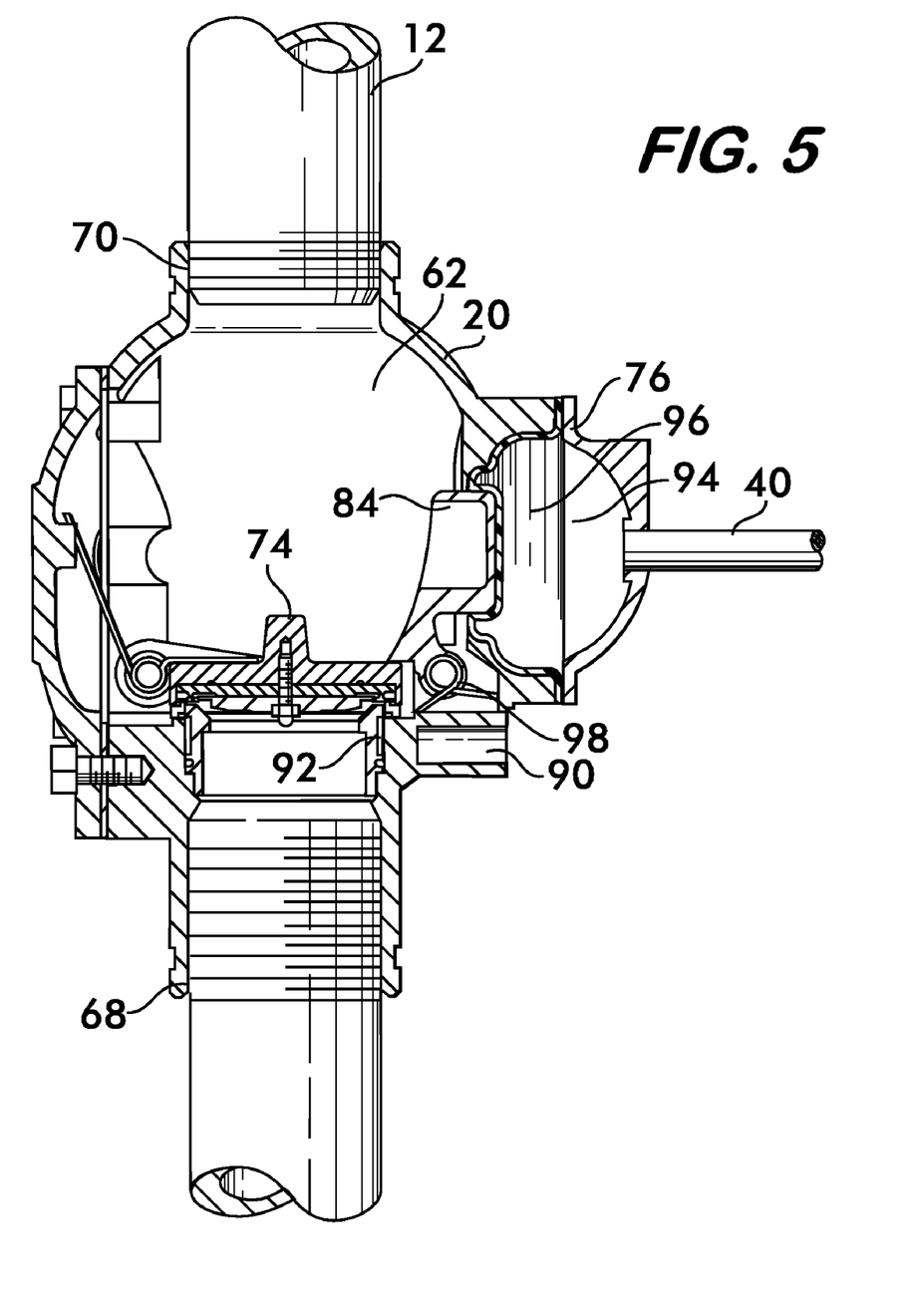
FIG. 5 is a longitudinal sectional view of a field convertible valve configured to operate in a dry system mode.
Figure 6:
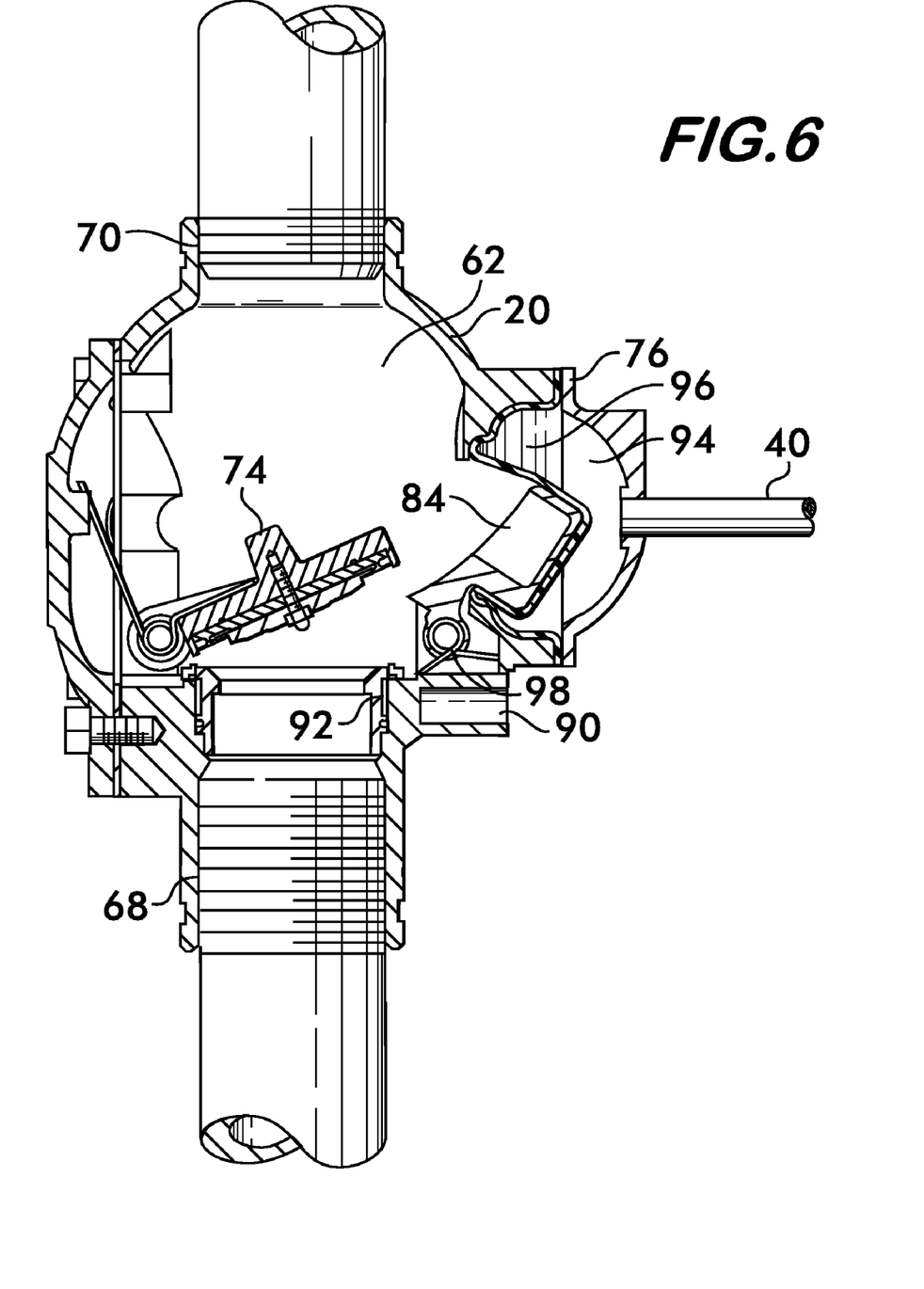
FIG. 6 is a longitudinal sectional view of a field convertible valve configured to operate in a wet system mode.

FIGS. 5 and 6 illustrate another embodiment of a field convertible valve 20 according to the invention. Valve 20 of FIG. 5 differs in the type of latch actuator used. In this embodiment, the latch actuator 76 used in the dry mode of operation comprises a sub-chamber 94 positioned adjacent to the valve chamber 62. A flexible diaphragm 96 partitions the sub-chamber from the valve chamber. The diaphragm is attached to the pivoting latch 84 which engages the valve closing member 74 when the valve is operated in the dry mode. Hydraulic pressure within the sub-chamber 94 acting on the diaphragm 96 through the water conduit 40 maintains the latch 84 engaged with the valve closing member 74, thereby keeping the valve closing member engaged with the valve seat. When this hydraulic pressure is relieved by action of the system actuator 38, the latch 84 is free to pivot and allow the valve closing member to disengage from the seat, opening the valve 20 as illustrated in FIG. 6. Latch 84 may have a biasing spring 98 which biases it away from the valve closing member to facilitate valve opening.

When operated in the wet mode, the field convertible valve 20 shown in FIGS. 5 and 6 is isolated from the compressed gas supply by the closing of gas control valve 34. The latch actuator 76 is isolated from the pressurized water source 16 by closing the shut-off valve 44. The system actuator 38 does not control opening of the valve 20, which is free to open in response to a pressure difference between the upstream and downstream sides of the valve seat. The latch 84 is biased away from the valve closing member 74 to allow free pivoting motion to open and close the valve. Again, there is a port 90 and an opening 92 positioned within the valve seat and closed by the valve closing member. When the valve closing member opens, it uncovers the opening 92 and permits water to flow through port 90 which is in fluid communication with a water motor alarm which signals the opening of the field convertible valve 20.

The system 10 may also include a temperature sensor 100 (see FIG. 1) that warns system operators of the approach of freezing temperatures. The temperature sensor may be mounted in the building or structure where the piping network extends and could trip an alarm or provide a signal to a control panel warning when temperatures drop below a threshold above freezing to give adequate warning to convert the system from a wet to a dry system.

Field convertible valves according to the invention provide an efficient way to change the mode of operation of a sprinkler system from a wet mode to a dry mode and vice-versa without duplicating parts or extensive replacement of major system components.

What is claimed is:
1. A fire suppression sprinkler system convertible for use as a wet system or a dry system, said sprinkler system comprising:
   a source of pressurized liquid;
   a piping network in fluid communication with said liquid source;

a plurality of sprinkler heads mounted on said piping network for discharging said liquid in the event of a fire;

a first valve positioned in said piping network between said liquid source and said sprinkler heads for controlling flow of said liquid thereto;

a bypass loop providing fluid communication between a point upstream of said first valve and downstream thereof, a bypass valve being positioned in said bypass loop for controlling flow of said liquid therethrough;

a source of pressurized gas;

a gas conduit providing fluid communication between said gas source and said piping network downstream of said first valve, a gas control valve being positioned within said gas conduit; and a system actuator in fluid communication with said gas source through said gas conduit, a liquid conduit providing fluid communication between said liquid source, said system actuator, and said first valve, a shut-off valve positioned within said liquid conduit, and wherein, when said system is operated as a dry system, said shut-off valve being open, said system actuator opening said first valve in response to a drop in gas pressure within said piping network, and when said system is operated as a wet system, said shut-off valve being closed, thereby isolating said system actuator from said liquid source, and said first valve opening in response to flow from at least one of said sprinkler heads.

2. A fire suppression sprinkler system according to claim 1, wherein said first valve comprises:

a chamber having an inlet and an outlet;

a seat positioned within said chamber downstream of said inlet;

a closing member positioned within said chamber and movable into and out of engagement with said seat to control fluid flow through said chamber;

a latch positioned within said chamber, said latch being movable between a first position engaging said closing member for maintaining said closing member in engagement with said seat, and a second position disengaged from said closing member and allowing said closing member to move out of engagement with said seat;

a latch actuator mounted on said valve and in fluid communication with said system actuator, said latch actuator being engageable with said latch for moving said latch between said first and second positions;

said bypass loop providing fluid communication between said inlet upstream of said seat and said chamber downstream of said seat.

3. A fire suppression sprinkler system according to claim 2, wherein said gas conduit is in fluid communication with said chamber downstream of said seat.

4. A fire suppression sprinkler system according to claim 2, wherein said closing member is pivotably mounted within said chamber for pivoting motion into and out of engagement with said seat.

5. A fire suppression sprinkler system according to claim 2, wherein said latch is pivotably mounted within said chamber for pivoting motion into and out of engagement with said closing member.

6. A fire suppression sprinkler system according to claim 2, wherein said valve actuator comprises:

a cylinder mounted on said first valve and in fluid communication with said system actuator;

a piston reciprocably movable within said cylinder; and a piston rod having one end attached to said piston and an opposite end engageable with said latch for moving said latch into engagement with said closing member upon motion of said piston.

7. A fire suppression sprinkler system according to claim 2, wherein said latch actuator comprises:

a sub-chamber positioned adjacent to said chamber and in fluid communication with said system actuator; and a flexible diaphragm partitioning said chamber from said sub-chamber, said diaphragm being attached to said latch, wherein increased fluid pressure within said sub-chamber deflects said diaphragm toward said chamber thereby moving said latch into engagement with said closing member.

8. A fire suppression sprinkler system according to claim 1, further including a temperature sensor positioned proximate to said piping network, said temperature sensor providing a signal at a predetermined ambient temperature acting as a warning to convert said system from a wet mode to a dry mode of operation.

* * * * *